(12) United States Patent
Winkler

(10) Patent No.: US 9,027,490 B2
(45) Date of Patent: May 12, 2015

(54) VESSEL COMPRISING A STOWABLE MAGNUS-EFFECT ROTOR

(76) Inventor: Jørn Paul Winkler, London (GB)

( * ) Notice: Subject to any disclaimer, the term of this patent is extended or adjusted under 35 U.S.C. 154(b) by 146 days.

(21) Appl. No.: 13/579,055

(22) PCT Filed: Feb. 14, 2011

(86) PCT No.: PCT/EP2011/052143
§ 371 (c)(1),
(2), (4) Date: Sep. 25, 2012

(87) PCT Pub. No.: WO2011/098605
PCT Pub. Date: Aug. 18, 2011

(65) Prior Publication Data
US 2013/0008363 A1 Jan. 10, 2013

(30) Foreign Application Priority Data

Feb. 15, 2010 (WO) ................ PCT/EP2010/051857
Jan. 10, 2011 (EP) ..................................... 11150443

(51) Int. Cl.
*B63H 9/02* (2006.01)
(52) U.S. Cl.
CPC .. *B63H 9/02* (2013.01); *Y02T 70/58* (2013.01)
(58) Field of Classification Search
USPC ............................................. 416/4; 114/39.3
See application file for complete search history.

(56) References Cited

U.S. PATENT DOCUMENTS

| 2,596,726 | A |   | 5/1952 | Rydell |
| 4,401,284 | A | * | 8/1983 | Austin ........................ 244/21 |
| 4,602,584 | A |   | 7/1986 | North et al. |
| 8,539,894 | B2 | * | 9/2013 | Levander ................... 114/39.3 |

FOREIGN PATENT DOCUMENTS

GB 2 187 154 9/1987

OTHER PUBLICATIONS

International Search Report dated Apr. 11, 2011, corresponding to PCT/EP2011/052143.

* cited by examiner

*Primary Examiner* — Edwin Swinehart
(74) *Attorney, Agent, or Firm* — Young & Thompson

(57) ABSTRACT

A vessel includes a hull and a deck, a substantially cylindrical rotor having a peripheral wall rotatable with respect to the deck around a longitudinal center line, the rotor being at a lower end connected to the deck and including an upper end plate, the rotor being mounted on the deck in such a manner that in an operational state the rotor is substantially vertically oriented and in an inoperational state the upper end plate is situated in the vicinity of the deck, the end plate extending transversely to the longitudinal center line, wherein the end plate is provided with movable edge segments that in the operational state of the rotor extend radially outwardly from the peripheral wall to an extended position and in the inoperational state of the rotor are moved to a retracted position that is situated closer to the peripheral wall than the extended position.

16 Claims, 9 Drawing Sheets

VESSEL COMPRISING A STOWABLE MAGNUS-EFFECT ROTOR

FIELD OF THE INVENTION

The invention relates to a vessel comprising a hull and a deck, a substantially cylindrical rotor having a peripheral wall rotatable with respect to the deck around a longitudinal center line, the rotor being at a lower end connected to the deck and comprising an upper end plate, the rotor being mounted on the deck in such a manner that in an operational state the rotor is substantially vertically oriented and in an inoperational state the upper end plate is situated in the vicinity of the deck, wherein the end plate extends transversely to the longitudinal center line.

BACKGROUND OF THE INVENTION

Such a Magnus-effect rotor is known from U.S. Pat. No. 4,602,584. It has long been known that a circular cylinder rotating about its longitudinal axis is capable of producing a lift force when placed in an air stream flowing perpendicular to the longitudinal axis of the cylinder, quite similar to the lift force produced by a wing when placed in a laminar air flow. This lift force is named after its discoverer, Heinrich Gustav Magnus, the German scientist who first investigated this phenomenon in 1853.

The Magnus-effect was first applied for propelling vessels in 1924 by Anton Flettner. Flettner used elongated cylinder structures, standing upright from the deck of the vessel, for propelling the vessel using the lift force mentioned (these structures were also called: "Flettner-rotors"). The advantage with respect to conventional sails was that the vessel was able to sail at sharper angles with respect to mildly opposing, thus relatively unfavourable, wind directions. Additionally, the Flettner-rotor was able to supplement the propulsion of fuel-powered vessel, thereby decreasing the fuel consumption of such a vessel.

However, in case of strong opposing winds essentially parallel to the desired sailing direction, or in wind conditions with severe gusts, the Flettner-rotor fails to provide any additional propulsion. In these conditions the rotor proves to be a great source of drag to due to the wind hitting the relatively large frontal surface of the rotor. Furthermore, in severe weather conditions with strong winds and high waves, the rotor proves to provide additional instability to the vessel due to the raised centre of gravity.

U.S. Pat. No. 4,602,584 provides a Magnus-effect rotor for use onboard a vessel, which offers the possibility of collapsing the rotor towards the deck, by pivoting it to a position essentially parallel to the longitudinal axis of the vessel, for minimizing the drag on the vessel in such unfavourable wind conditions. More specifically, U.S. Pat. No. 4,602,584 describes an elliptical cylinder, having a major and a minor axis, and a longitudinal axis, upstanding from the deck of the vessel and formed from a rigid outer surface which is rotatable about a central longitudinal axis. The elliptical cylinder can be "parked" in a generally upright position where the cylinder can act as a conventional sail, aligning the minor axis with the wind, or in a position where the elliptical cylinder can be feathered in the wind, aligning the major axis with the wind, thereby reducing drag. Furthermore, during unfavourable wind conditions the elliptical cylinder, or rotor, can be parked in a position where it is essentially parallel to the longitudinal axis of the vessel, thereby not interfering in any way with the maneuvering or propulsion of the vessel.

A drawback of folding such a rotor towards the deck is that as the end plate has a relatively large diameter, thereby taking up a lot of space, deck operations can be hampered. Furthermore, the folding operation itself is interfered with by the large end plate diameter. Also, when standing upright from the deck in unfavourable wind conditions or heavy winds in general, such a rotor end plate has a large wind resistance in view of its large surface area and is therefore susceptible to relatively high forces.

Another patent publication that describes a stowable rotor is GB 2.187.154. This publication describes a rotor for ship propulsion, which is constructed as a series of cylindrical sections increasing stepwise in diameter from section to section up the height of the rotor so that the rotor can be retracted telescopically into a well in the ship's deck. A central non-rotating support post inside the rotor is fitted with a top bearing that carries the rotor, the post also being telescopic. The topmost rotor section has a boundary layer fence projecting radially around its top end, and the step increase in diameter between each of the sections below and the section above it provides a respective boundary layer fence for the rotor section below in each case. No motor drive can be found in the publication for actively rotating the rotor around its longitudinal axis as required for generating a propulsion force on the vessel. The known vessel does not provide for effectively stowing the rotor on the vessel in a compact inoperational state in which it has minimal wind interference.

Yet another patent publication that describes a stowable rotor is U.S. Pat. No. 2,596,726. This patent publication describes a wind motor for driving a ship's propeller. More specifically, it describes a motor standing on a bed constructed within the hull of a ship. Stay-lines are employed for keeping the rotor erect relative to the ship. The motor furthermore includes a base plate fastened to the ship's bed by bolts and a mast socketed at its lower end in a boss formed on said base plate, the mast being fitted at its upper end with a spider bracket. The motor further includes a rotor which turns freely around the mast. The rotor comprises a tubular rotor shaft encircling the mast and upper and lower disc-like end plates axially keyed to the rotor shaft. No drive means for actively rotating the rotor around its longitudinal axis are disclosed that are required for generating a Magnus-effect. The rotor is actually being used to provide power to the propeller of the ship. The rotor itself fails to provide a driving force on the vessel. No possibility of stowing the rotor in a compact inoperational position is disclosed.

In view of the foregoing, it is an object of the invention to provide for a Magnus-effect rotor, where the space taken up by the end plate during and after folding or retraction of the rotor is minimized.

SUMMARY OF THE INVENTION

Thereto, the end plate is provided with movable edge segments that in the operational state of the rotor extend radially outwardly from the peripheral wall to an extended position and in the inoperational state of the rotor are moved to a retracted position that is situated closer to the peripheral wall than the extended position.

By having the end plate provided with movable edge segments the end plate's diameter can effectively be decreased. The movable edge segments can be moved towards a retracted position that is situated closer to the peripheral wall than the extended position, causing the end plate to require less space. Therefore, the deck space used during and after folding of the rotor or telescopic retraction of the rotor is decreased and deck operations can proceed in an undisturbed manner. It is hence possible to stow the rotor in its retracted position in the narrow space between two cargo holds, between the hatches of the these holds.

Reducing the dimensions of the upper end plate and optionally, the lower end plate in the stowed position of the rotor is advantageous during conditions of heavy winds in order to reduce the interaction of the end plates with waves and wind.

Also handling of the rotor during the retracting operation in which it is moved from a substantially vertical to a horizontal position, or in which it is lowered by telescoping action or vertical retraction into the hull, is facilitated when the end plate is in its compacted state.

It is advantageous to provide a vessel, wherein the end plate comprises a central part fixed to the peripheral wall of the rotor, the edge segments being attached to the central part in a hingeable manner around respective hinge lines that lie substantially in the plane of the central part, the edge segments in the extended position being substantially transverse to the longitudinal center line and in the retracted position being oriented substantially in the direction of the longitudinal center line. By doing so, the movable edge segments can be most effectively retracted, in a space-wise sense.

Furthermore, it is advantageous to provide a vessel, wherein adjacent foldable segments are foldable in opposite directions with respect to each other. By doing so, overlapping of adjacent segments is minimized and no additional measures are needed for preventing disadvantageous effects, such as segments scraping against each other, from the overlapping of segments.

Additionally, it is advantageous to provide a vessel, wherein the movable segments comprise side segments which are, at least partially, sideways retractable with respect to the movable segments. Thus, the movable segments can be folded in any direction without having to deal with any disadvantages from the overlapping of segments.

Also, a vessel can advantageously be provided, wherein the movable segments comprise diaphragmatically rotatable segments, the segments being rotatable with respect to a central part of the end plate. Thus, the segments can advantageously be stored under the surface of the central part, further optimizing the space available for deck operations after or during folding of the rotor. Also, after unfolding of the rotor the segments can be extended advantageously by making use of centrifugal forces resulting from the spinning up of the rotor for operations, therefore skipping over the need for an additional extension mechanism for the segments.

Furthermore, a vessel can advantageously be provided, wherein the movability of the segments is effectuated by a driving means connected to the movable segments. The driving means allow for accurate controllability of the positioning of the segments.

Additionally, a vessel can be provided, wherein the driving means comprise a hydraulics system for moving the segments. The driving means can advantageously be provided with a hydraulics system for moving the segments. A hydraulics system provides the advantage of being relatively reliable, especially in conditions at sea, where high moisture and salt levels can interfere with moving parts.

It would also be advantageous to provide a vessel, where the driving means comprising a pneumatics system for moving the segments. A pneumatics system basically has the same advantage as a hydraulics system, i.e. being relatively reliable in demanding conditions, such as at sea.

Furthermore, it is advantageous to provide a vessel, wherein the driving means comprise an electrical system for moving the segments. An electrical system has as an advantage that the positioning of the segments can be effectuated even more accurately, and the overall size of the electrical driving means in terms of utilized space is relatively small.

Additionally, a vessel can advantageously be provided with driving means comprising a rope-and-pulley system for moving the segments. In regions of the world with relatively extreme weather conditions, such as heavy rains, the utmost reliability for operating the movable segments can be achieved by using a rope-and-pulley system. The ropes are attached to segment surfaces and run over pulleys to the inside of the rotor, where they are connected to a pulling device for pulling the segments to a desired position.

Moreover, a vessel can advantageously be provided, wherein in use the effective diameter of the end disc is changeable due to the movable segments being movable as a result of centrifugal forces causable by rotation of the rotor. This can be achieved by positioning the segments with respect to the rotor in such a way that centrifugal forces resulting from the spinning up of the rotor swing the movable segments outwards.

Also disclosed herein is a vessel comprising a hull, one or more cargo compartments within said hull, a propeller for propulsion of the vessel and at least one rotatable cylinder which in its operational state is vertically mounted on the vessel, the cylinder having a rigid outer surface, a rotational drive means for rotating the cylinder around a longitudinal axis and a displacement member for displacing the cylinder to an inoperational position, characterised in that the rotatable cylinder comprises two or more telescopically connected tubular segments and an extension member situated along the longitudinal axis, attached to the segments for raising the segments into an operational state in which the extension member is extended and the segments are overlapping with ring-shaped end parts, and for lowering the segments into an inoperational state in which the extension member is retracted and the segments are nested such that their outer surfaces are overlapping.

The telescopically connected tubular segments ensure that the cylinder can be reduced in size conveniently, e.g. when sailing against the wind or during severe weather conditions. An extension member is provided for retracting the tubular segments to an inoperational state, in these conditions, and for extending them into an operational state when wind or weather conditions have improved again. In the inoperational state the outer surfaces overlap, thereby protecting the cylinder from environmental conditions. Due to its reduced size in its inoperational state it is also easier to exchange the cylinder in case of a defect. In case of relatively small defects, where the cylinder does not need to be exchanged, the cylinder is still relatively easy to access for repairs due to its reduced size.

Furthermore it is advantageous to have the cylinder hingeably attached to a deck of the vessel, the cylinder in its retracted stated being hingeable around a hinge axis for placing its longitudinal axis into a horizontal position. By placing the cylinder with its longitudinal axis into a horizontal position, even less deck space is consumed, and any unwanted drag on the rotor is minimized.

Also, it is advantageous to have an end part of the cylinder be receivable in a cradle on the deck of the vessel, at a distance from the hinge axis which is not larger than the length of the cylinder in its retracted state. By providing a cradle on the deck of the vessel for receiving the cylinder in its retracted state the cylinder can be securely fixed to the deck.

Additionally, it is advantageous to have the cylinder mounted over a receiving chamber in the vessel, the receiving chamber being situated in a cargo compartment or in a space between an inner and an outer wall of the hull, the extension member being adapted for lowering the cylinder into the receiving chamber and for raising the cylinder from the receiving chamber. This provides the advantage of retracting the cylinder below the deck. Moreover, optimal use is made of the area in the hull. Alternatively the cylinder can be stored in the cargo space of the vessel. Both options provide the advantage of having the cylinder out of the way of deck operations. Furthermore, the cylinder is shielded from environmental conditions.

Furthermore, it is advantageous to provide the vessel with a cylindrical receiving chamber, having a peripheral wall of substantially the length of the cylinder in its retracted state. This provides for a dedicated storage space for storing the cylinder, where it is protected from the contents of the hull. Also, the cylinder is protected from the ingress of sea water. Moreover, it provides for an integral unit for exchanging the cylinder in case of defects. The integral unit also provides for the opportunity to have the rotor retrofitted on existing vessels.

Additionally, it is advantageous to provide the cylindrical receiving chamber with a bottom wall. This provides for a sealed-off receiving chamber, where the cylinder is protected from water and contents of the hull.

Also it is advantageous to have the cylinder at its top comprise a circular plate of larger diameter than the cylinder, fixedly attached to the upper tubular segment, the extension member extending from a bottom of the cylinder to the circular plate and being attached to said plate via a bearing to allow rotation of the plate relative to the extension member. This provides the cylinder with the ability to lift the tubular segments during the telescopic movement via the circular top plate.

It is also advantageous to have the lower part of the extension member connected to a cable, which runs over a pulley positioned essentially on top of the displacement member, wherein the cable is connected to a winch for extending and retracting the extension member. This allows for a relatively compact and lightweight design of the extension and retraction mechanism. Of course the extension and retraction mechanism can also be provided with a hydraulic system, or a servo-driven system for displacing the extension member with respect to the displacement member.

Additionally, it is advantageous to provide the inside of the cylinder with a support member positioned along the longitudinal axis of the extension member and displacement member, connecting the extension member and displacement member to the cylinder, thereby providing additional rigidity to the cylinder. The support member comprises a bearing for allowing rotation relative to the extension member and displacement member. The support member can for example comprise a wheel running along the inner circumference of the cylinder. The additional rigidity improves the mechanical reliability of the structure and reduces vibrations.

Also disclosed herein is a vessel comprising a hull, one or more cargo compartments within said hull, a propeller for propulsion of the vessel and at least one rotatable cylinder which in its operational state is vertically mounted on the vessel, the cylinder having a rigid outer surface, a rotational drive means for rotating the cylinder around a longitudinal axis and a displacement member for displacing the cylinder to an inoperational position, characterised in that the cylinder is mounted over a receiving chamber in the vessel, the receiving chamber being situated in the cargo compartment or in a space between an inner and an outer wall of the hull, the vessel comprising a lifting device for displacing the cylinder in its length direction for lowering the cylinder into the receiving chamber in its inoperational state and for raising the cylinder from the receiving chamber in its operational state.

The lifting device ensures that the cylinder as a whole can be lifted into a receiving chamber in the hull or in the cargo compartment, e.g. when sailing against the wind or during severe weather conditions. This provides for a relatively quick way for removing the cylinder from the deck in these conditions, and for freeing up deck space accordingly. Furthermore, the cylinder is thus shielded from environmental conditions. Additionally, by storing the cylinder in a receiving chamber it is also easier to exchange the cylinder in case of a defect.

It is also advantageous to have a cylindrical receiving chamber, having a peripheral wall, providing for a dedicated storage space for storing the cylinder, where it is relatively protected from the contents of the hull. Also, the cylinder is relatively well-protected from the ingress of sea water. Moreover, it provides for a relatively integral unit for exchanging the cylinder in case of defects.

Additionally, it is advantageous to provide the cylindrical receiving chamber with a bottom wall. This provides for an even more sealed-off receiving chamber, where the cylinder is relatively better protected from sea water and contents of the hull from below.

Moreover, it is advantageous to provide the receiving chamber with a cover member for covering the receiving chamber in a water-tight manner. This provides for the cylinder being relatively well-protected from the ingress of sea water from above. Moreover, it provides for a relatively integral unit for exchanging the cylinder in case of defects.

Furthermore, it is advantageous to have the cylinder at its top comprise a circular plate of larger diameter than the cylinder, where the circular plate forms the cover member. A two-fold advantage is achieved in that the circular plate represents an optimal geometrical shape for preventing vorticity at the top of the cylinder in the operational state, as well as forming a cover member for sealing off the inoperational cylinder from the environment, e.g. during stormy weather.

Also it is advantageous to let the rotational drive means comprise a motor which is fixed to a deck of the vessel or to the receiving chamber and a drive member which is fixed to the rotatable cylinder and which can be displaced into the inoperational state and raised to the operational state together with the cylinder by the lifting device. The drive member for example may comprise gear wheels, or a drive belt. The drive member is lowered and raised along with the cylinder, which allows for easy access of the motor for maintenance and inspection.

Furthermore, it is advantageous to have the cylinder rotated by the drive means via a drive shaft running essentially parallel to the longitudinal axis of the cylinder. The drive shaft can also be advantageously placed inside the displacement or extension members—in case of a cylinder with telescopic tubular segments—, rotating the cylinder via appropriate means for transmitting the rotational forces of the drive shaft. The drive shaft can also comprise telescopic elements, to allow the drive shaft to extend or retract along with the tubular segments of a cylinder with telescopic segments. The means for transmitting the rotational forces of the drive shaft to the cylinder can advantageously connect to the support member, as to rotate the cylinder via the support member. The means for transmitting the rotational forces of the drive shaft to the cylinder can advantageously comprise a gear wheel or any other type of suitable wheel, such as wheel with friction material on its rim, as to rotate the cylinder via friction. Thus, by using such a drive shaft to rotate the cylinder an even distribution of driving force can be achieved over the cylinder, especially over a cylinder comprising tubular segments, reducing vibrations. The drive shaft itself can be advantageously driven via a drive belt attached to the drive means.

The drive means in general can be advantageously placed inside the cylinder, in order to prevent the drive means from being exposed to the environment. The drive means can be connected to the inside of the cylinder via any appropriate means for transmitting rotational forces, such as gear wheels, or to the drive shaft, for example via a drive belt or drive chain.

Also disclosed herein is a rotatable cylinder for use in a vessel as mentioned in the foregoing.

BRIEF DESCRIPTION OF THE DRAWINGS

Further objects and advantageous aspects of the invention will be apparent from the claims and the following detailed description of an embodiment of the invention in conjunction with the drawings, in which:

DETAILED DESCRIPTION OF THE INVENTION

Figure 1:
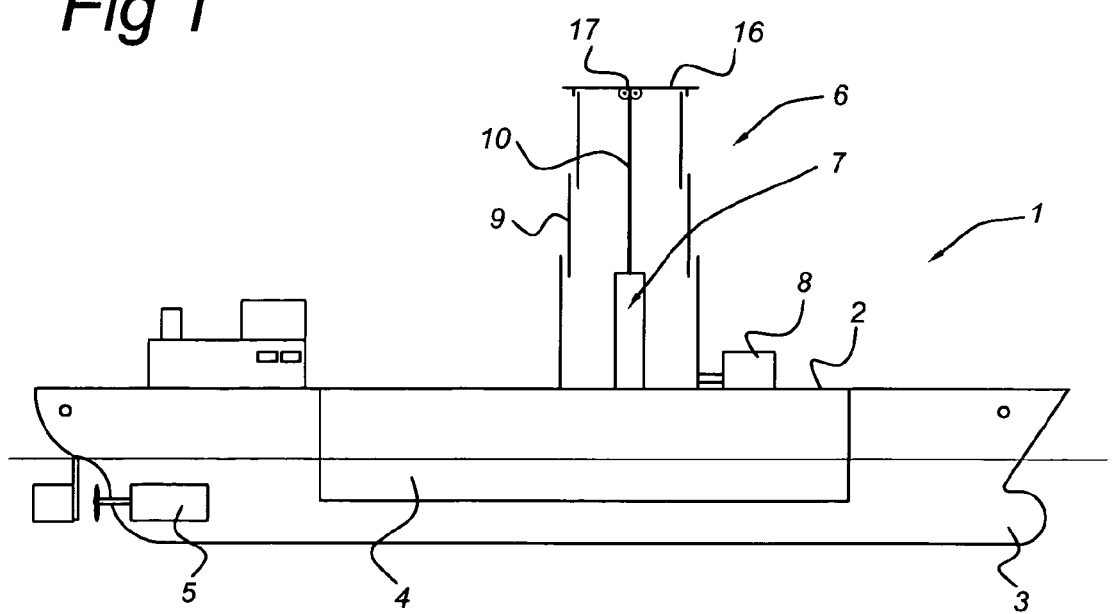
FIG. 1 shows a schematic side view of a vessel equipped with a telescopically retractable rotor in an extended, operational state, according to an embodiment of the invention.

FIG. 1 shows a schematic side view of a vessel equipped with a telescopically retractable rotor in an extended, operational state, according to an embodiment of the invention; the vessel 1 is provided with a cargo compartment 4 for storing cargo. The vessel 1 is also equipped with a propulsion system 5 for propelling the vessel 1. The hull 3 comprises the forementioned cargo compartment 4. The upper part of the hull 3 is formed by the deck 2. The cylindrical rotor 6 is placed on the deck 2. Also situated on the deck 2 is a rotational drive means 8 for rotating or spinning the rotor 6 to a desired rotational speed. The rotor 6 itself comprises several tubular segments 9. The tubular segments 9 are telescopically fitted into each other, with their longitudinal axes essentially in line with each other and their outer surfaces partly overlapping. Along the longitudinal axis of the rotor 6 a displacement member 7 is placed for extending the rotor 6 to its operational state, and for retracting the rotor 6 to its inoperational state. The displacement member 7 is provided with an extension member 10. The extension member 10 connects to a circular plate 16 on top of the rotor 6. The displacement member 7 can for example comprise a hydraulic cylinder. The circular plate 16 is allowed to have rotational freedom with respect to the extension member 10. This rotational freedom concerns rotation around the longitudinal axis of the extension member 10. The circular plate 16 is provided with bearings 17 to accomplish this. The circular plate 16 furthermore functions as a vorticity reduction means with respect to a rotating rotor 6.

Figure 2:
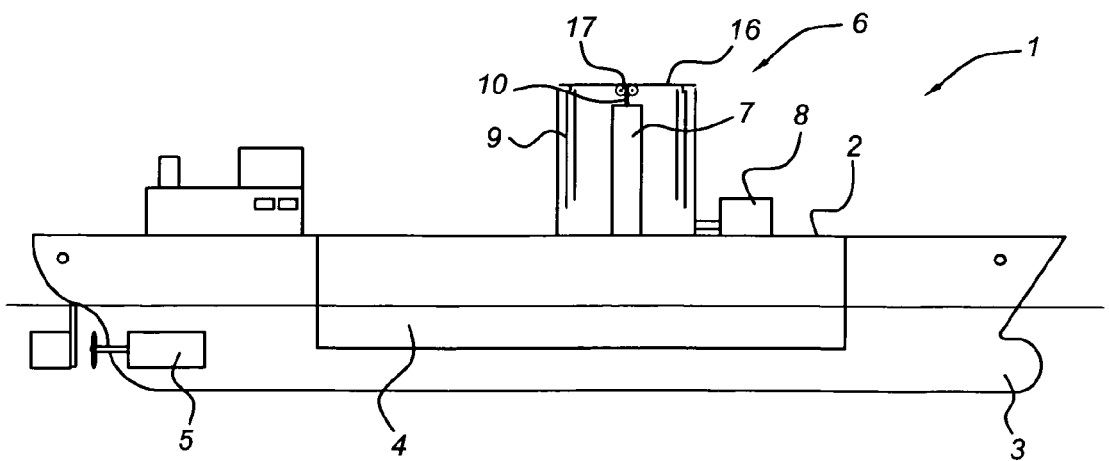
FIG. 2 shows a schematic side view of the vessel equipped with the telescopically retractable rotor, with the rotor in a retracted, inoperational state.

FIG. 2 shows a schematic side view of the vessel equipped with the telescopically retractable rotor, with the rotor in a retracted, inoperational state; again, the figure shows a vessel 1 equipped with a telescopically retractable rotor 6, but now the rotor 6 is shown in a retracted, inoperational state; the vessel 1 is again provided with a cargo compartment 4 for storing cargo. The vessel 1 is also equipped with a propulsion system 5 for propelling the vessel 1. The hull 3 comprises the forementioned cargo compartment 4. The upper part of the hull 3 is formed by the deck 2. The cylindrical rotor 6 is placed on the deck 2. Also situated on the deck 2 is a rotational drive means 8 for rotating or spinning the rotor 6 to a desired rotational speed. The rotor 6 itself comprises several tubular segments 9. The tubular segments 9 are telescopically fitted into each other, with their longitudinal axes in line with each other. Now the outer surfaces of the tubular segments 9 are almost fully overlapping. Along the longitudinal axis of the rotor 6 a displacement member 7 is placed for extending the rotor 6 to its operational state, and for retracting the rotor 6 to its inoperational state. The displacement member 7 is provided with an extension member 10. The extension member 10 connects to a circular plate 16 on top of the rotor 6. The displacement member 7 can for example comprise a hydraulic cylinder. The circular plate 16 is allowed to have rotational freedom with respect to the extension member 10. This rotational freedom concerns rotation around the longitudinal axis of the extension member 10. The circular plate 16 is provided with bearings 17 to accomplish this. The tubular segments 9 are now nested such that their outer surfaces are overlapping. The circular plate 16 shields the rotor 6 from the environment. The circular plate 16 furthermore functions as a vorticity reduction means with respect to a rotating rotor 6 in its operational, i.e. extended, state.

Figure 3:
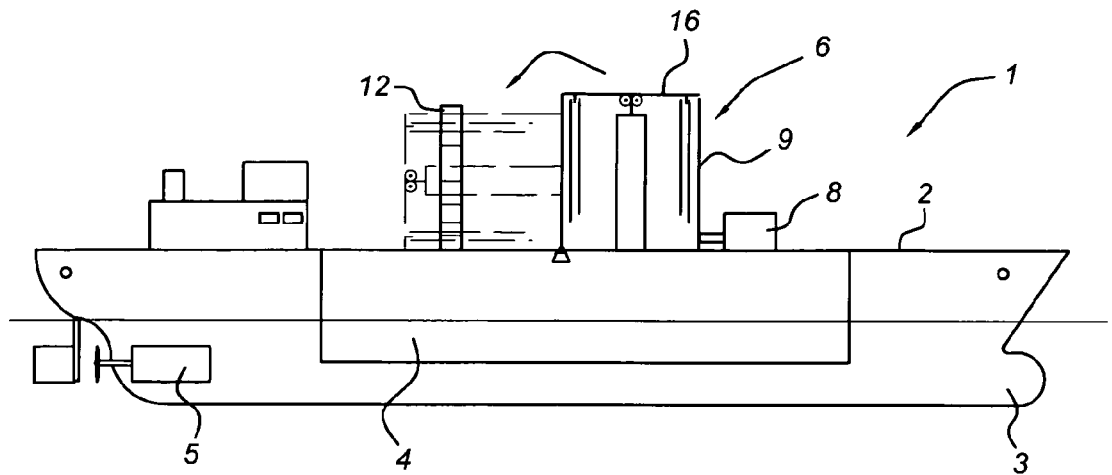
FIG. 3 shows a schematic side view of the vessel equipped with the telescopically retractable rotor in the retracted, inoperational state, wherein the rotor is hingeable around a hinge axis for placing its longitudinal axis into a horizontal position.

FIG. 3 shows a schematic side view of the vessel equipped with the telescopically retractable rotor in the retracted, inoperational state, wherein the rotor is hingeable around a hinge axis for placing its longitudinal axis into a horizontal position; again, the figure shows a vessel 1 equipped with a telescopically retractable rotor 6, with the rotor 6 in a retracted, inoperational state, basically as shown in FIG. 2; the vessel 1 is again provided with a cargo compartment 4 for storing cargo. The vessel is also equipped with a propulsion system 5 for propelling the vessel 1. The hull 3 comprises the forementioned cargo compartment 4. The upper part of the hull 3 is formed by the deck 2. The cylindrical rotor 6 is placed on the deck 2. Also situated on the deck 2 is a rotational drive means 8 for rotating or spinning the rotor 6 to a desired rotational speed. The rotor 6 itself comprises several tubular segments 9. The tubular segments 9 are telescopically fitted into each other, with their longitudinal axes in line with each other. The tubular segments 9 are nested such that their outer surfaces are overlapping. Along the longitudinal axis of the rotor 6 a displacement member 7 is placed for extending the rotor 6 to its operational state, and for retracting the rotor 6 to its inoperational state. Note that the displacement member 7 is not shown for clarity. On top of the rotor a circular plate 16 is provided for shielding the rotor 6 from the environment. The circular plate 16 furthermore functions as a vorticity reduction means with respect to a rotating rotor 6 in its operational, i.e. extended, state. Also, the rotor 6 is connected to the deck 2 via a hinge 11. The retracted rotor 6 can thus be hinged around a hinge axis for placing its longitudinal axis from an upright position A into a horizontal position B. The rotor 6 can be securely connected to the deck 2 via a cradle 12.

Figure 4:
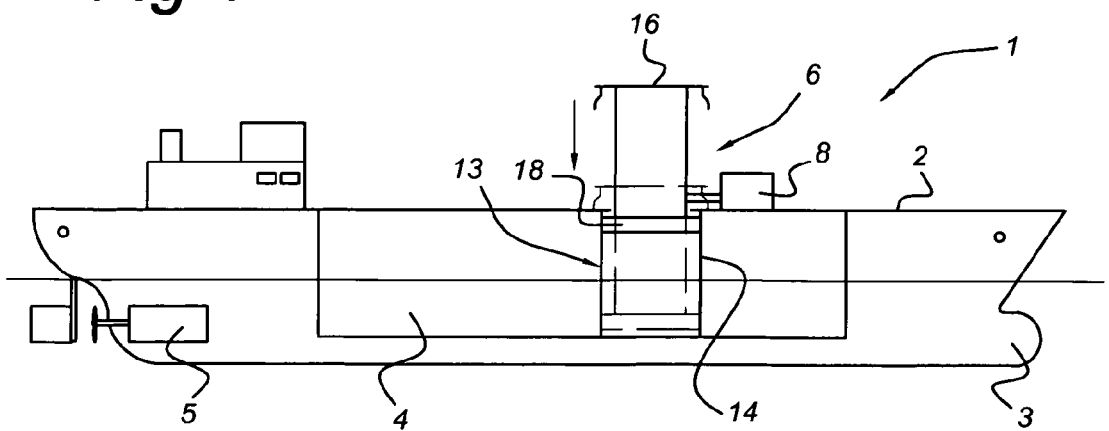
FIG. 4 shows a schematic side view of a vessel equipped with a rotor, wherein the rotor is mounted over a receiving chamber in the vessel.

FIG. 4 shows a schematic side view of a vessel equipped with a rotor, wherein the rotor is mounted over a receiving chamber in the vessel; again, the figure shows a vessel 1 equipped with a rotor 6, but now the rotor 6 comprises only one tubular segment; the vessel 1 is again provided with a cargo compartment 4 for storing cargo. The vessel 1 is also equipped with a propulsion system 5 for propelling the vessel 1. The hull 3 comprises the forementioned cargo compartment 4. The upper part of the hull 3 is formed by the deck 2. The cylindrical rotor 6 is placed on the deck 2. Also situated on the deck 2 is a rotational drive means 8 for rotating or spinning the rotor 6 to a desired rotational speed. Again a circular plate 16 is provided for shielding the rotor 6 from the environment. The circular plate 16 furthermore functions as a vorticity reduction means with respect to a rotating rotor 6 in its operational, in this case raised, state. The inoperational state is defined by the lowered state, i.e. with the rotor 6 received in the receiving chamber 13. Furthermore FIG. 4 shows the receiving chamber 13, which in this case is provided with a cylindrical peripheral wall 14. A lifting device 18 is provided in the receiving chamber 13 for raising and lowering the rotor 6. Note that the bottom of the receiving chamber 13 is open.

Figure 5:
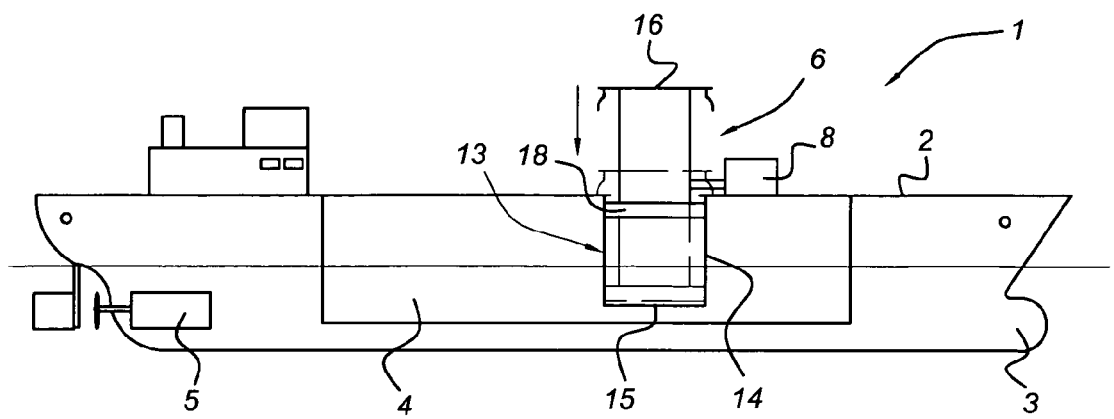
FIG. 5 shows a schematic side view of the vessel equipped with the rotor, wherein the rotor is mounted over the receiving chamber in the vessel, the receiving chamber furthermore comprising a bottom wall.

FIG. 5 shows a schematic side view of the vessel equipped with the rotor, wherein the rotor is mounted over the receiving chamber in the vessel, the receiving chamber furthermore comprising a bottom wall; FIG. 5 is identical to FIG. 4, apart from the receiving chamber 13 being provided with a bottom wall 15.

Figure 6:
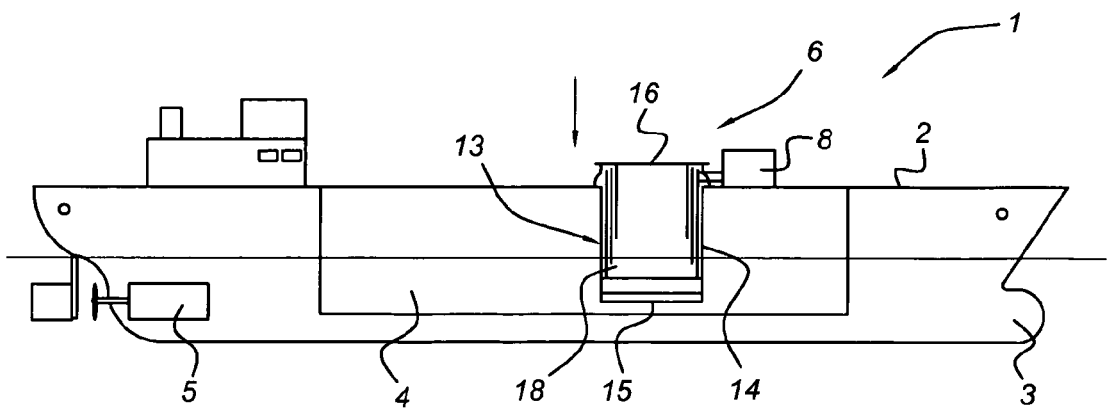
FIG. 6 shows a schematic side view of the vessel equipped with the telescopically retractable rotor, with the rotor in the retracted, inoperational state, wherein the rotor has been lowered into the receiving chamber in the vessel.

FIG. 6 shows a schematic side view of the vessel equipped with the telescopically retractable rotor, with the rotor in the retracted, inoperational state, wherein the rotor has been lowered into the receiving chamber in the vessel; FIG. 6 is basically identical to FIG. 2, apart from the rotor 6 of FIG. 6 being lowered in the receiving chamber 13. Thus FIG. 6 shows a rotor 6 which is both telescopically retractable/extendable, as well as a rotor 6 which can be raised from the receiving chamber 13 towards the deck 2, and which can be lowered into the receiving chamber 13 from the deck 2. The lowered, retracted state of the rotor 6 is shown in FIG. 6.

Figure 7:
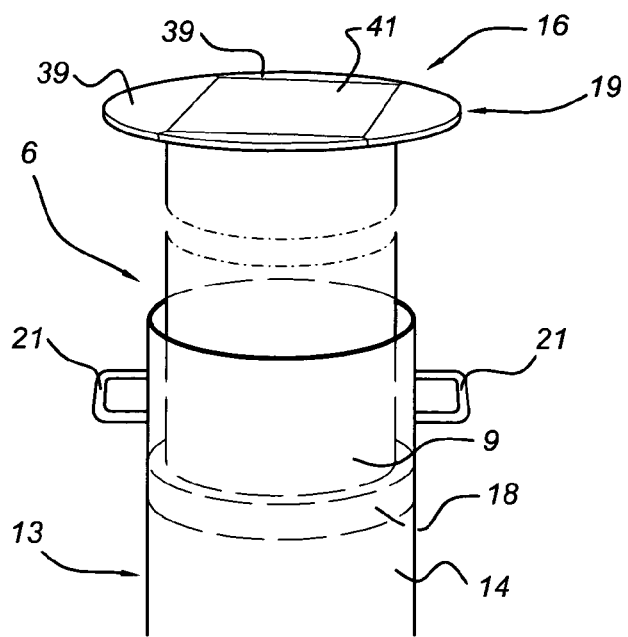
FIG. 7 shows a close-up perspective view of the receiving chamber.

FIG. 7 shows a close-up perspective view of the receiving chamber; the receiving chamber 13 is shown, provided with a cylindrical peripheral wall 14. The rotor 6 of FIG. 6 is also shown, almost fully lowered into the receiving chamber 13. The rotor 6 is again provided with a circular plate 16, with the circular plate 16 also functioning as a cover member 19 for sealing off the receiving chamber 13. The receiving chamber 13 is provided with handles 21 for relatively easy lifting of the receiving chamber 13 with the rotor 6 out of the vessel 1. This provides for relatively easy exchange of the cylindrical receiving chamber 13 with its contents in case of defects. This also provides for relatively easy retrofitting, if desired, of a cylindrical receiving chamber 13 with the rotor 6 in a vessel 1. FIG. 7 shows the end plate 16 being provided with movable segments 39. The segments 39 are movable with respect to a central end plate 41. The segments 39 can be folded downwards or upwards. FIG. 7 shows four segments 39, but more segments 39 can be used, for instance six or eight.

Figure 8:
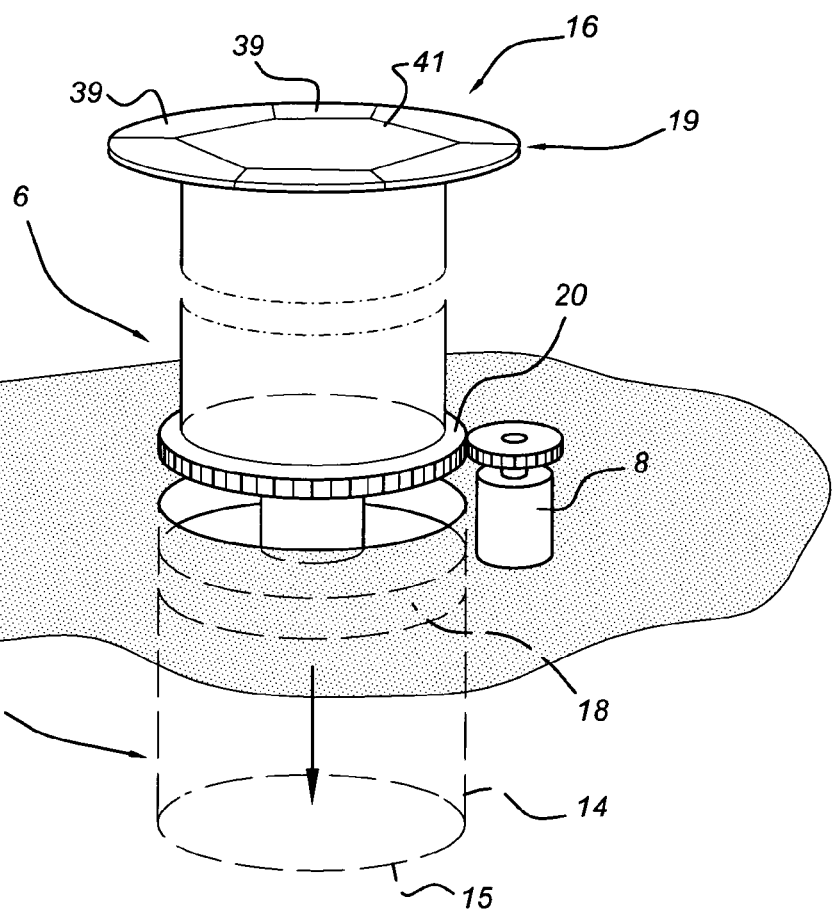
FIG. 8 shows a close-up perspective view of the lower part of the rotor, with a lifting device for lowering the rotor into the receiving chamber.

FIG. 8 shows a close-up perspective view of the lower part of the rotor, with a lifting device for lowering the rotor into the receiving chamber. Basically, FIG. 8 shows the rotor 6 of FIG. 6 or 7 in a close-up view of the lower part of the rotor 6. The rotor 6 is shown in its raised, operational state. With the rotor 6 in its operational state, the rotational drive means 8 rotate the rotor 6 to a desired rotational speed via a drive member 20. The drive member 20 can e.g. comprise gear wheels, as shown. The gear wheels allow the rotor 6 to relatively quickly disengage from the drive means 8—e.g. in case of unfavourable wind conditions—and consequently allow the rotor 6 to be lowered into the receiving chamber 13 via the lifting device 18. The receiving chamber 13 is also shown with the bottom wall 15. FIG. 8 also shows the end plate 16 being provided with movable segments 39. The segments 39 are movable with respect to a central end plate 41. FIG. 8 shows the end plate 16 comprising six segments, but more can be used. The segments 39 can be folded upwards or downwards.

Figure 9:
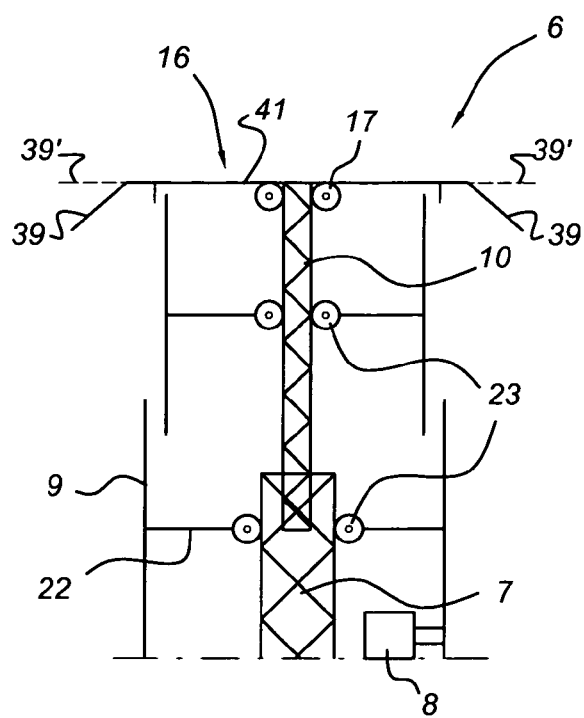
FIG. 9 shows a schematic cross-sectional side view of the cylinder, with support members.

FIG. 9 shows a schematic cross-sectional side view of the cylinder, with support members. FIG. 9 shows the inside of the cylinder 6 provided with two support members 22 positioned along the longitudinal axis of the extension member 10 and displacement member 7, connecting the extension member 10 and displacement member 7 to a tubular segment 9, thereby providing additional rigidity to the cylinder 6. The support member 22 comprises a bearing 23 for allowing rotation relative to the extension member 10 and displacement member 7. Furthermore, FIG. 9 shows the displacement member 7 and extension member 10 advantageously comprising a truss-structure. The truss structure allows for a lightweight yet strong structure for the displacement member 7 and extension member 10. Of course it is also possible to have just the displacement member 7 provided with a truss structure, or just the extension member 10 provided with a truss structure. In a broader sense, a truss structure can also be applied to other parts in the interior of the cylinder 6, such as to the inner surface of the cylinder 6. FIG. 9 also shows the end plate 16 being provided with movable segments 39. The segments 39 are movable with respect to a central end plate 41. The segments 39 are shown in a retracted position, i.e. close to the cylinder surface. The segments 39 can be retracted even closer to the cylinder surface if necessary. Segments 39' are shown in the extended position.

Also, FIG. 9 shows the drive means 8 being positioned inside the cylinder 6 for advantageously protecting the drive means 8 from the environment. FIG. 9 schematically shows the drive means 8 connected to the inside of the cylinder 6 for rotating it.

Figure 10:
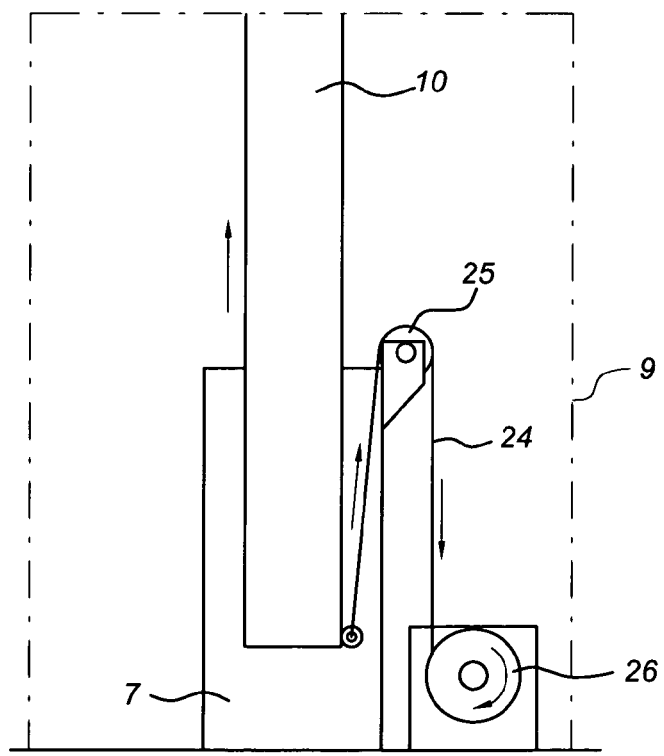
FIG. 10 shows a close-up cross-sectional view of an embodiment of the extension and retraction mechanism.

FIG. 10 shows a close-up cross-sectional view of an embodiment of the extension and retraction mechanism. The lower part of the extension member 10 is connected to a cable 24, which runs over a pulley 25 positioned essentially on top of the displacement member 7, wherein the cable 24 is connected to a winch 26 for extending and retracting the extension member 10.

Figure 11:
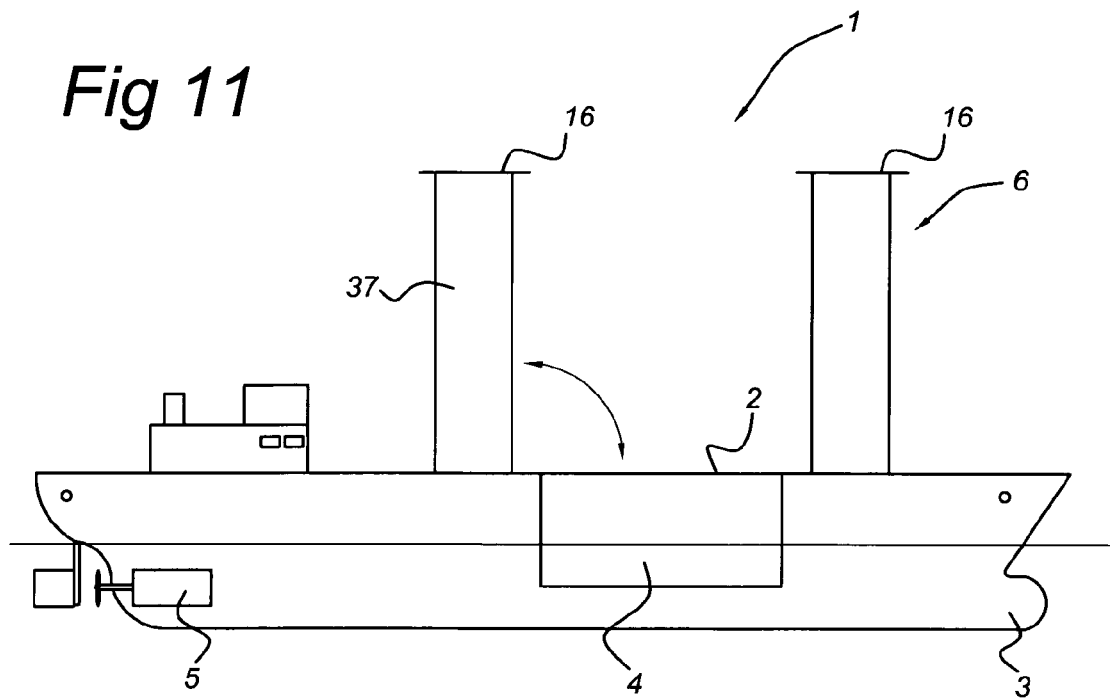
FIG. 11 shows a schematic side view of a vessel equipped with a foldable Flettner rotor in an unfolded state.

FIG. 11 shows a schematic side view of a vessel 1 equipped with a foldable rotor 6 in an unfolded state. More specifically, FIG. 11 shows a vessel 1, which comprises a hull 3 in which a cargo compartment 4 is positioned. Furthermore, the vessel 1 is provided with a propulsion system 4 and a deck 2. A rotor 6 is standing on the deck 2 in an upright position. The rotor 6 is provided with a cylindrical rotor part 37 and an end plate 16 positioned on the part of the rotor 6 unconnected to the deck 2. The rotor 6 can be folded towards the deck 2 by means of a hinge (not shown) situated near the lower part of the rotor 6.

Figure 12A:
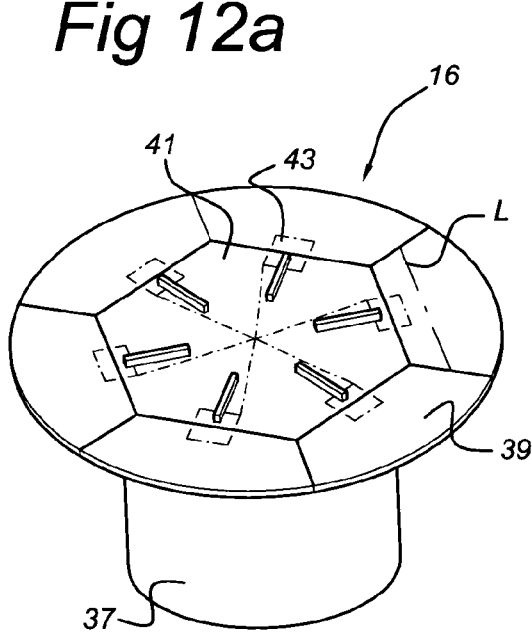
FIG. 12a shows a schematic, perspective view of a rotor comprising movable end plate segments, the segments being shown in an extended position.

FIG. 12*a* shows a schematic, perspective view of a rotor 6 comprising movable end plate segments 39, the segments 39 being shown in an extended position; the rotor shows a cylindrical rotor part 37 with an end plate 16 on top of it. The end plate 16 comprises a central part 41 with six movable edge segments 39 positioned at its circumference. The edge segments 39 are movable with respect to the central part 41. Furthermore, FIG. 12 schematically shows driving means 43 for moving the movable edge segments 39. The edge segments 39 can also be folded along a folding line L present in the segment 39 itself for obtaining additional space savings.

Figure 12B:
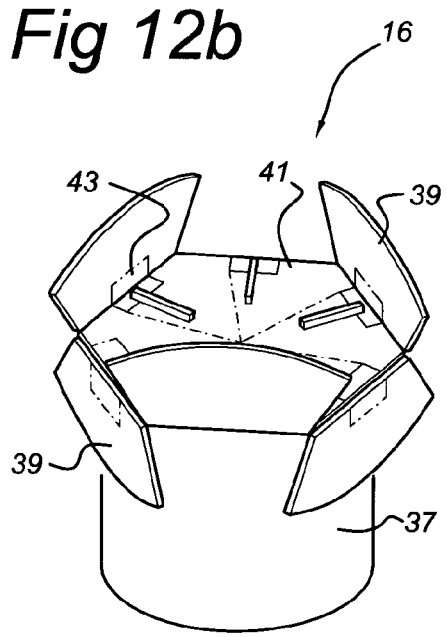
FIG. 12b shows a schematic, perspective view of a rotor comprising movable end plate segments, the segments being shown in a retracted position.

FIG. 12*b* shows a schematic, perspective view of a rotor 6 comprising movable end plate segments 39, the segments 39 being shown in a retracted position; the rotor shows the movable edge segments 39 after being moved with respect to the central part 41. Three of the movable edge segments 39 have been folded upwards with respect to the central part 41, the other three movable edge segments 39 have been folded downwards. Adjacent segments 39 are folded in opposite directions with respect to each other. The edge segments 39 can also be folded along a folding line present in the segment 39 itself for obtaining additional space savings.

Figure 13:
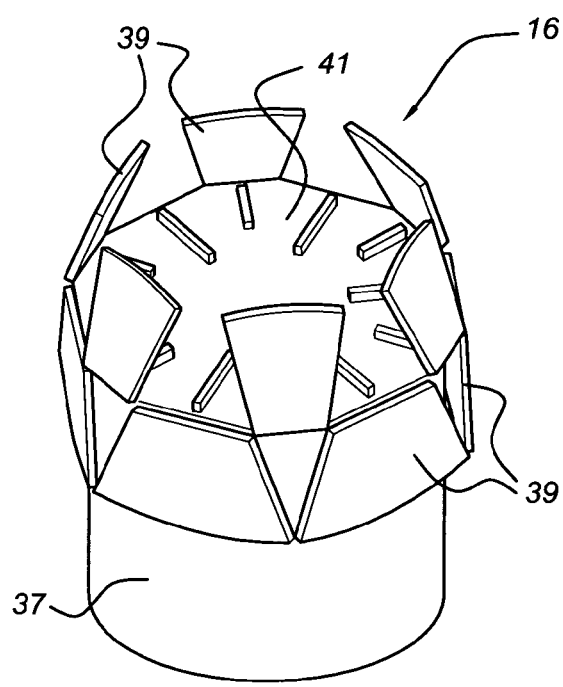
FIG. 13 shows a schematic, perspective view of another embodiment of a rotor comprising movable end plate segments.

FIG. 13 shows a schematic, perspective view of another embodiment of a rotor comprising movable end plate segments 39; the rotor shows a cylindrical rotor part 37 with an end plate 16 on top of it. The end plate 16 comprises a central part 41 with twelve movable edge segments 39 positioned at its circumference. Again, adjacent edge segments 39 are folded in opposite direction with respect to each other. The edge segments 39 are in a moved position with respect to the central part 41. Six edge segments 39 have been folded upwards with respect to the central part 41, the other six have been folded downwards.

Figure 14:
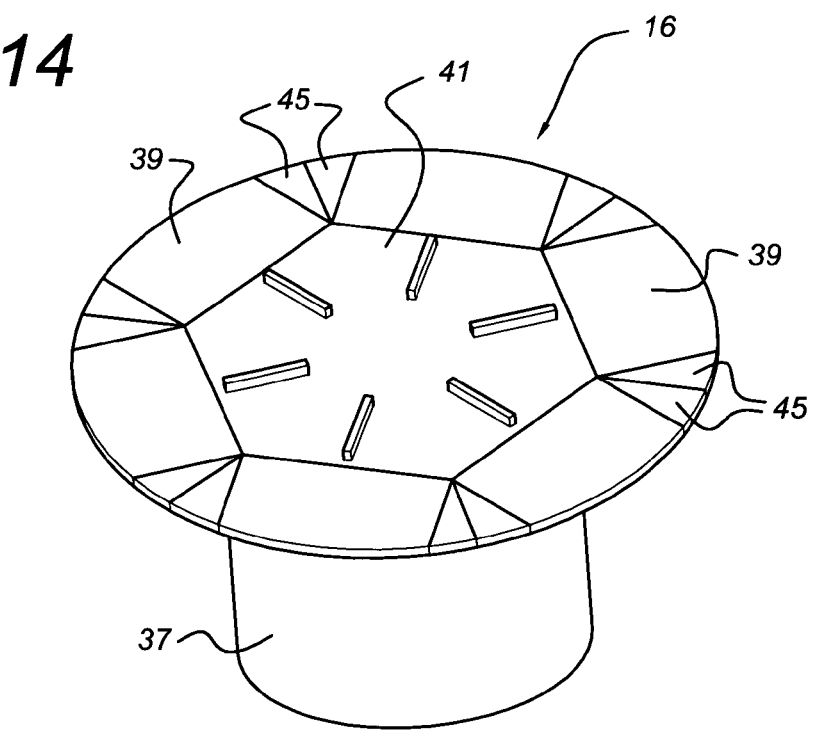
FIG. 14 shows a schematic, perspective view of another embodiment of a rotor comprising movable end plate segments, wherein the movable segments comprise side segments which are, at least partially, sideways retractable with respect to the movable segments.

FIG. 14 shows a schematic, perspective view of another embodiment of a rotor comprising movable end plate edge segments 39, wherein the movable edge segments 39 comprise side segments 45 which are, at least partially, sideways retractable with respect to the movable segments 39. Again, FIG. 14 shows a central plate 41 with six movable edge segments 39 attached to its circumference. The movable segments 39 are foldable with respect to the central plate 41. The side segments 45 are shown in an extended state with respect to the movable edge segments 39. The side segments 45 are retractable within the movable edge segments 39. The side segments 45 can also be retractable below or above a surface of a movable edge segment 39. In the extended state the side segments 45 can be provided with a locking mechanism for ensuring a proper lock between two adjacent side segments 15.

Figure 15D:
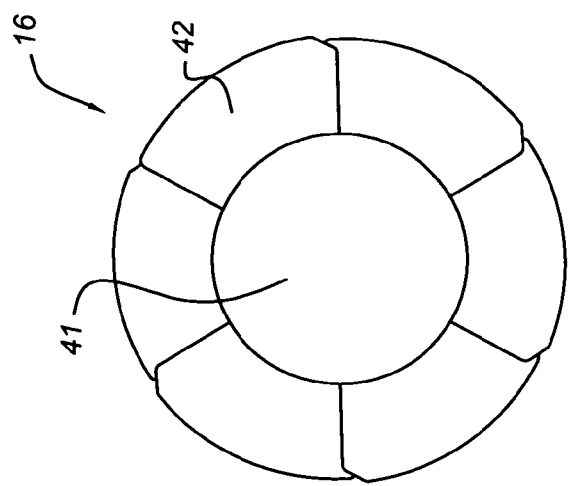
FIG. 15d shows another schematic top view of a rotor end plate having diaphragmatically rotatable segments, the segments being rotatable with respect to a central part of the end plate and being shown in a fully extended state.
Figure 15C:
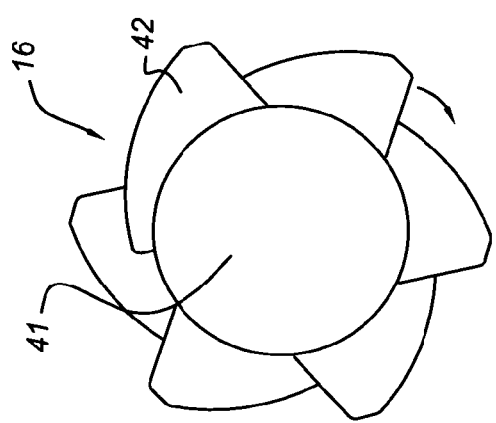
FIG. 15c shows another schematic top view of a rotor end plate having diaphragmatically rotatable segments, the segments being rotatable with respect to a central part of the end plate and being shown in a partially extended state.
Figure 15B:
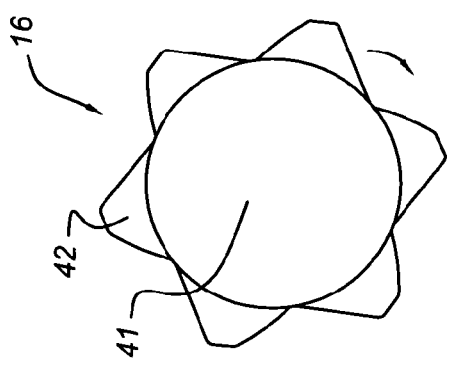
FIG. 15b shows another schematic top view of a rotor end plate having diaphragmatically rotatable segments, the segments being rotatable with respect to a central part of the end plate and being shown in a partially extended state.
Figure 15A:
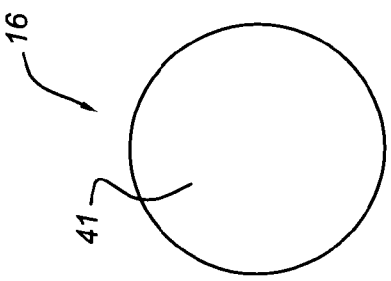
FIG. 15a shows a schematic top view of a rotor end plate having diaphragmatically rotatable segments, the segments being rotatable with respect to a central part of the end plate and being in a fully retracted state.

FIG. 15*a* shows a schematic top view of an end plate 16, wherein the movable edge segments are formed by diaphragmatically rotatable segments 42, the segments 42 being rotatable with respect to a central part 41 of the end plate 16. The segments 42 are not shown, as they are fully retracted in the end plate 16.

FIG. 15*b* shows another schematic top view of an end plate 16, wherein the movable edge segments are formed by diaphragmatically rotatable segments 42, the segments 42 being rotatable with respect to a central part 41 of the end plate 16. The segments 42 are shown in a partially extended state.

FIG. 15*c* shows another schematic top view of an end plate 16, wherein the movable edge segments are formed by diaphragmatically rotatable segments 42, the segments 42 being rotatable with respect to a central part 41 of the end plate 16. The segments 42 are shown in a partially extended state, but extended further than the state shown in FIG. 15*b*.

FIG. 15*d* shows another schematic top view of an end plate 16, wherein the movable edge segments are formed by diaphragmatically rotatable segments 42, the segments 42 being rotatable with respect to a central part 41 of the end plate 16. The segments 42 are shown in a fully extended state.

Figure 16:
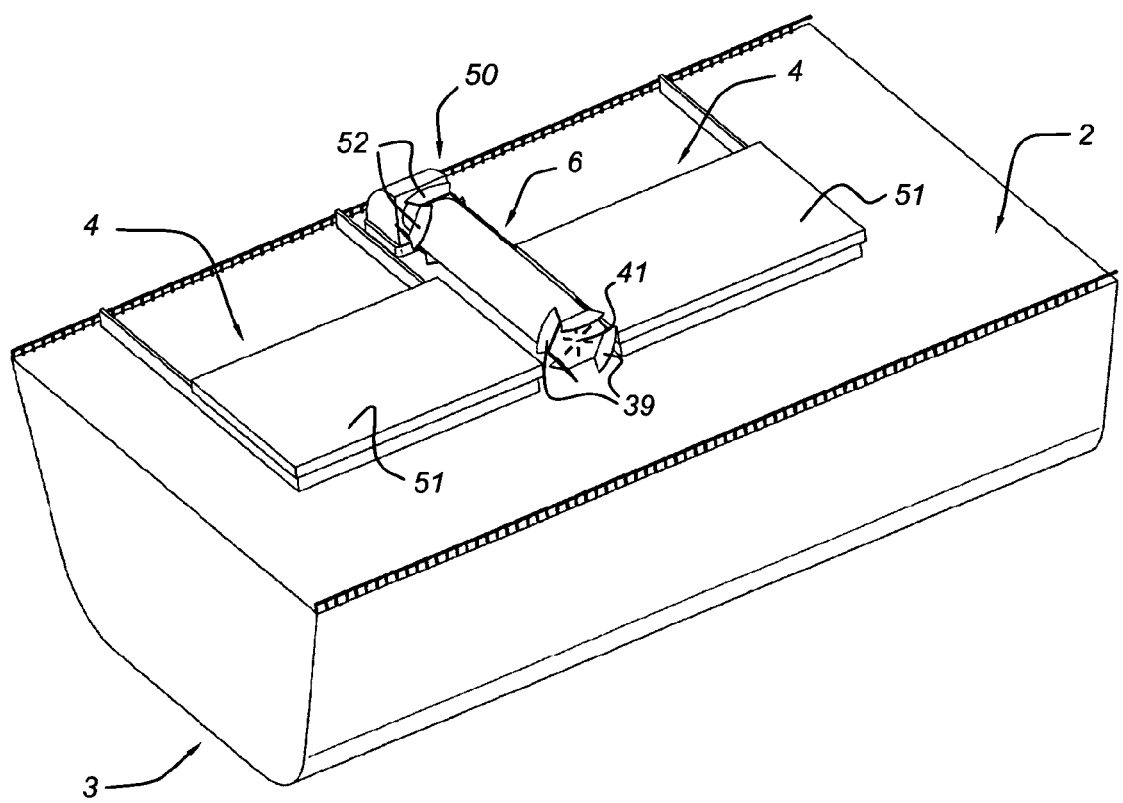
FIG. 16 shows a schematic, perspective view of a part of a vessel provided with a rotor comprising a foldable end plate and a foldable bottom plate.

FIG. 16 shows a schematic, perspective view of a part of a vessel 1 provided with a rotor 6 comprising a foldable end plate 16 and a foldable bottom plate 50. The bottom plate 50 is shown having movable segments 52. The movable segments 52 of the lower end plate, or bottom plate, 50 are shown in a retracted state. The movable segments 52 are shown folded in opposite directions with respect to each other. The rotor 6 is folded towards the deck 2, being in an inoperational state. The upper end plate 16 is also shown in a retracted state. The movable segments 39 are shown folded in opposite directions with respect to each other. The rotor 6 lies between to hatches 51, the hatches 51 covering respective cargo compartments 4.

The invention claimed is:

1. A vessel (1) comprising a hull (3) and a deck (2), a substantially cylindrical rotor (6) having a peripheral wall rotatable with respect to the deck (2) around a longitudinal center line, the rotor (6) being at a lower end supported on the deck (2) and comprising an upper end plate (16), the rotor (6) being mounted on the deck (2) in such a manner that in an operational state the rotor (6) is substantially vertically oriented and in an inoperational state the upper end plate (16) is situated in the vicinity of the deck (2), the end plate (16) extending transversely to the longitudinal center line, wherein the end plate (16) is provided with movable edge segments (39) that in the operational state of the rotor (6) extend radially outwardly from the peripheral wall to an extended position and in the inoperational state of the rotor (6) are moved to a retracted position that is situated closer to the peripheral wall than the extended position.

2. The vessel (1) according to claim 1, wherein the end plate (16) comprises a central part (41) fixed to the peripheral wall of the rotor (6), the edge segments (39) being attached to the central part (41) in a hingeable manner around respective hinge lines that lie substantially in a plane of the central part (41), the edge segments (39) in the extended position being substantially transverse to the longitudinal center line and in the retracted position being oriented substantially in the direction of the longitudinal center line.

3. The vessel (1) according to claim 1, wherein adjacent movable edge segments (39) are foldable in opposites directions with respect to each other.

4. The vessel (1) according to claim 1, further comprising side segments (45) which are, at least partially, sideways retractable with respect to the movable edge segments (39).

5. The vessel (1) according to claim 1, wherein the movable edge segments (39) comprise diaphragmatically rotatable segments (42), the segments (42) being rotatable with respect to a central part (41) of the end plate (16).

6. The vessel (1) according to claim 1, wherein the movability of the movable edge segments (39) is effectuated by a driving means (43) connected to the movable edge segments (39).

7. The vessel (1) according to claim 6, wherein the driving means (43) comprises a hydraulics system for moving the movable edge segments (39).

8. The vessel (1) according to claim 6, wherein the driving means (43) comprises a pneumatics system for moving the movable edge segments (39).

9. The vessel (1) according to claim 6, the driving means (43) comprising an electrical system for moving the movable edge segments (39).

10. The vessel (1) according to claim 6, the driving means (43) comprising a rope-and-pulley system for moving the movable edge segments (39).

11. The vessel (1) according to claim 1, wherein in use the effective diameter of the end plate (16) is changeable due to the movable segments (39) being movable as a result of centrifugal forces causable by rotation of the rotor (6).

12. The vessel (1) according to claim 1, the rotor (6) comprising a lower end plate (50) situated near the deck, the lower end plate (50) comprising movable edge segments (52) that in the operational state of the rotor (6) extend radially outwardly from the peripheral wall to an extended position and in the inoperational state of the rotor (6) are moved to a retracted position that is situated closer to the peripheral wall than the extended position.

13. The vessel (1) according to claim 2, wherein adjacent movable edge segments (39) are foldable in opposites directions with respect to each other.

14. The vessel (1) according to claim 2, further comprising side segments (45) which are, at least partially, sideways retractable with respect to the movable edge segments (39).

15. The vessel (1) according to claim 3, further comprising side segments (45) which are, at least partially, sideways retractable with respect to the movable edge segments (39).

16. The vessel (1) according to claim 2, wherein the movability of the movable edge segments (39) is effectuated by a driving means (43) connected to the movable edge segments (39).

* * * * *